United States Patent Office 3,616,809
Patented Nov. 2, 1971

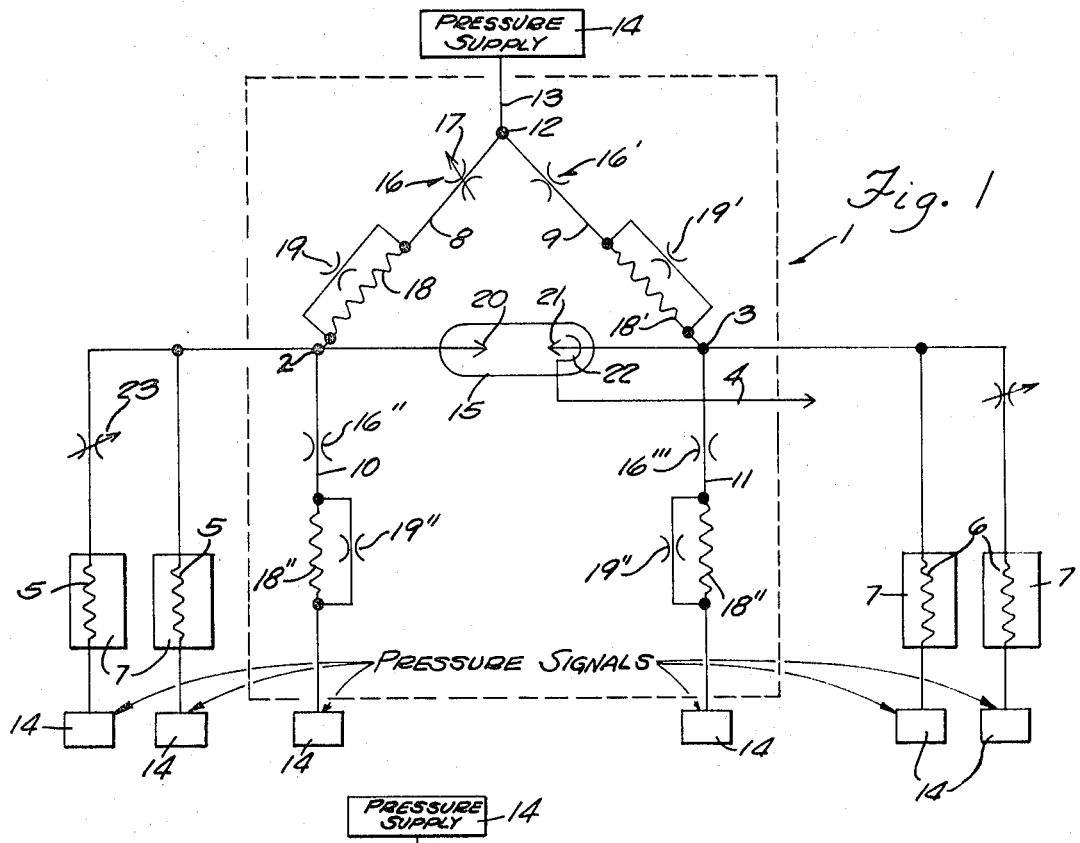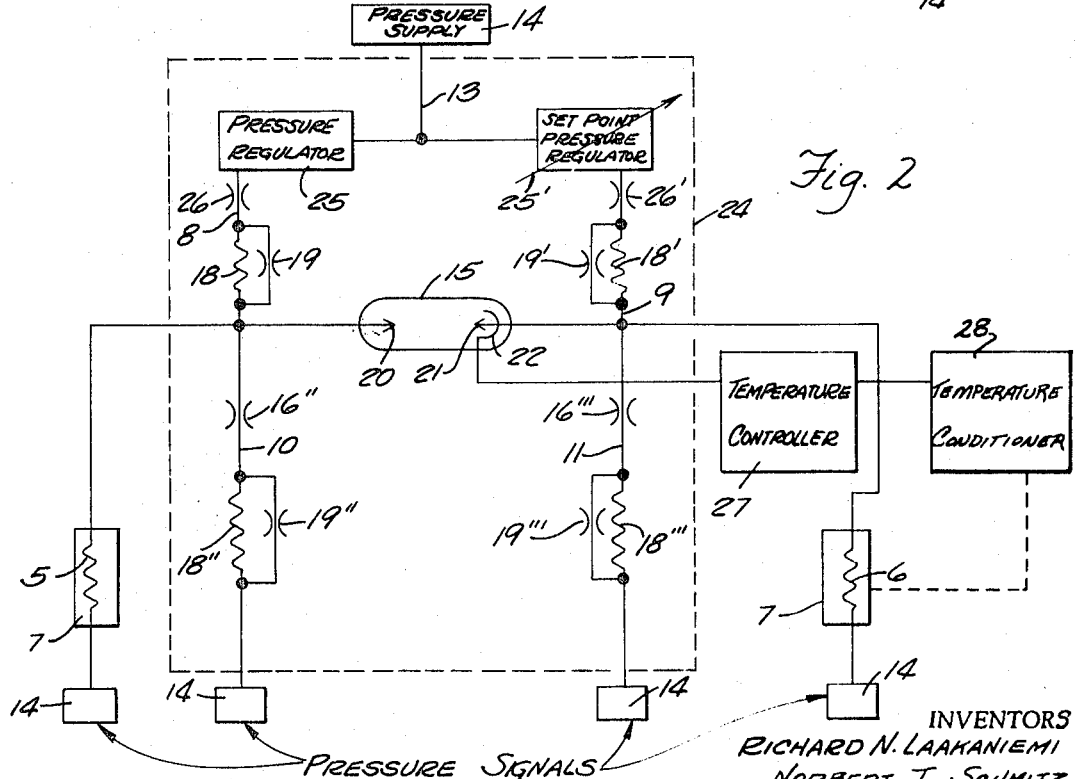

3,616,809
FLUIDIC CONDITION SENSING APPARATUS
Richard N. Laakaniemi and Norbert T. Schmitz, Milwaukee, Wis., assignors to Johnson Service Company, Milwaukee, Wis.
Filed Aug. 28, 1969, Ser. No. 853,730
Int. Cl. F15c 1/20, 4/00
U.S. Cl. 137—81.5                   16 Claims

ABSTRACT OF THE DISCLOSURE

The disclosure includes a plurality of fluidic temperature sensing capillary tube resistors mounted within related enclosures to subject the tube resistors to the environmental temperature condition. The tube resistors are connected in a sensing network having a modified Wheatstone bridge of fluidic resistance, including linear and non-linear capillary tube resistors and non-linear orifice restrictors providing compensation for pressure, temperature and the like. A summing impact modulator is connected across the output terminals of the bridge. The one input side is connected to a fluid source and the adjacent legs include a variable restrictor or pressure regulator for adjusting of a desired set point. The opposite input side has the legs connected to pressure signal and/or reference sources. The temperature sensing capillary tube resistances are connected in parallel with the two branches connected to the latter input side. The output of the summing modulator is a pressure signal directly related to the temperatures of the capillary tube resistors, which is connected in an environmental control loop.

BACKGROUND OF THE INVENTION

This invention relates to a fluidic condition sensing apparatus and particularly to such fluidic apparatus for producing an output proportional to temperature, pressure and the like.

Recent developments in the fluidic arts have provided fluidic systems which can function analogously to electronic systems. In fluidic devices, a main power stream or jet interacts with a relatively low level control signal stream or jet to produce an amplified output. A highly and unusually satisfactory fluidic amplifying device is shown in the Bjornsen et al. Pat. 3,272,215 wherein a pair of generally opposed impacting streams interact with respect to an orifice means to establish an output dependent upon the relative strength of the two streams. A particular application of this basic novel concept to the addition of a plurality of fluid signals is shown in U.S. Pat. 3,388,713 to Lechner et al. entitled "Pure Fluid Summing Impact Modulator and Universal Amplifiers Constructed Therewith." Such devices have been satisfactorily employed in condition responsive control systems. For example, a temperature condition can be sensed by a suitable temperature to fluid transducer, which applies a fluid pressure signal to a suitable fluidic detector for producing a temperature related fluid output. Temperature related outputs have also been produced in a fluidic oscillator wherein a temperature change induces a frequency change in the oscillator which is converted by resistance and capacitance elements to a corresponding change in the static output pressure level; for example, as shown in U.S. Pat. 3,373,600.

Although the prior art devices produce a fluidic output proportional to temperature, the devices are relatively complex systems and have a relatively slow response characteristic because of the conventional transducer response time. A direct fluidic temperature transducer has also been suggested including a Wheatstone bridge circuit with capillary tube resistances in the one pair of legs to develop a differential output pressure signal, which may avoid the complexity and response of the such other systems. However, the system, particularly for small signal detection, is subject to circuit noise and ambient temperature and pressure variations.

SUMMARY OF THE INVENTION

The present invention is particularly directed to a fluidic sensing system providing a fluidic output directly and rapidly in accordance with the sensed condition such as temperature or other similar environmental condition. The fluidic system is constructed to provide compensation for ambient pressure and temperature sensitivities of the system. The latter characteristic can also be such that the system compensates for ambient pressure and/or temperature characteristic sensitivity of the amplifying portion of controller forming a part of an overall control system. Furthermore, the fluidic system of the present invention further allows the addition and/or subtraction of two or more condition responsive signals.

Generally, in accordance with the present invention, a sensing flow conduit which provides a laminar flow, such as a linear fluidic resistor or a capillary restrictor is interconnected as a sensing resistance to a sensing network having a fluidic output. The sensing fluidic conduit is subjected to the condition; for example, temperature to be sensed. The sensing network includes a balanced network of fluidic resistance devices including in accordance with this invention an adjustable set point control element, a fluidic amplifying means connected across the output terminals and compensating fluidic elements of a linear and non-linear function. In a particularly novel aspect of the invention, a summing impact modulator such as shown in the U.S. Pat. 3,388,713 to Lechner et al., is connected across the output terminals. The summing impact modulator has an extremely high gain and may therefore produce a useful output signal with a minimum number of stages. This has been found to substantially minimize noise level in the output and the fluid consumption. Further, the summing impact modulator may have a plurality of different inputs to the opposite sides thereof for purposes of multiple algebraic summation. The one side of the balanced network is connected to a fluid source and the adjacent legs are provided with suitable fluidic resistance elements, one of which is variable for adjusting of a desired set point and operating level, such as an adjustable orifice restrictor, a pressure regulator or the like. The opposite legs of the network include fluidic resistance elements connected to suitable signal and/or reference pressures. By proper connection of the sensing resistance elements, the balanced circuit provides direct acting, reverse acting or differential acting response.

In accordance with a particularly novel aspect of the present invention, compensating fluidic resistance elements are provided in at least one of the legs and may be provided in a plurality of the legs of the network to establish direct compensation for ambient pressure and/or temperature changes. The compensating fluidic resistance elements include at least one linear element and one non-linear element with the elements connected in parallel and preferably in series with third element to define a series-parallel branch. Where the device is applied in a control system including an amplifying portion or loop, the ambient temperature and pressure sensitivity may be selected by proper compensation elements to offset a corresponding ambient temperature and pressure sensitivity of the amplifying loop. The final instrument will, therefore, have a zero overall ambient temperature and pressure sensitivity. This provides a reliable fluidic device which can be practically applied and thus provides a highly significant advantage in the construction of fluidic sensing and controlling systems.

The sensitivity of the network, which is defined as the change in output signal with respect to a condition change surrounding the network can be similarly varied by changing the relative resistance values of the fluidic resistance elements. The change may be obtained by changing the value or the number of series or parallel connected fluidic resistances, in one or more of the legs. In fact, applicant has found that it is possible to vary the sensitivites to be equal to, less than or greater than zero.

The selective positioning of the temperature sensing resistance to the independent or dependent side of the summing impact modulator provides a related direct acting output and indirect acting output. Similarly, placing a pair of fluidic temperature sensitive resistors or capillary restrictors to the opposite side of the network establishes a differential output signal related to the signal inputs. The relative affect of any fluidic sensing resistance element can be controlled by adjustable fluid resistance means external to the sensing resistance element.

Applicant has found that the present invention provides reliable and accurate sensing means for environmental controls, particularly with compensation for environmental temperature and pressure and where a control loop requires combining a plurality of condition responsive fluidic signals.

The drawing furnished herewith illustrates the best mode presently contemplated by the inventors for carrying out the subject invention and clearly discloses the above features as well as other which will be readily understood from the following description of the illustrated embodiments.

BRIEF DESCRIPTION OF DRAWING

In the drawing:

FIG. 1 is a schematic circuit of a fluidic bridge constructed in accordance with the present invention and employing adjustable restrictors for set point control; and FIG. 2 is a view similar to FIG. 1 illustrating a similar network employing pressure regulators for controlling of the set point and connected in a loop control system.

DESCRIPTION OF ILLUSTRATED EMBODIMENTS

Referring to the drawing and particularly to FIG. 1, the present invention is illustrated including a fluidic multiple branch balanced network 1 having a pair of common signal input-output terminals or lines 2 and 3 and an output terminal or line 4. In the illustrated embodiment of the invention, fluid temperature sensitive resistance elements 5 and 6, such as capillary tubular resistors or capillary tubular restrictors which provide a laminar flow, are connected to the input junctions 2 and 3, respectively. The output signal at line 4 is directly related to the temperature of the environment applied to the resistance elements which are diagrammatically shown within enclosure blocks 7.

In particular, in the illustrated embodiment of the invention the network 1 includes a modified wheatstone bridge system having four similar branches or legs 8, 9, 10 and 11 with the upper two legs 8 and 9 interconnected at a junction 12 to a pressure supply line 13 such as an air source and the lower two legs 10 and 11 separately connected to related signal or reference pressure sources 14 to complete the input fluid supply connection.

A summing impact modulator 15 is interconnected between the other pair of junctions of the bridge network 1 which correspondingly are connected to the common input-output terminals 2 and 3 for the temperature sensing resistance element and thus, form the common input-output terminals of network 1.

As each of the legs 8, 9, 10 and 11 is generally similarly constructed in the illustrated embodiment the first leg 8 is described in detail with the corresponding elements of the other three branches 9, 10 and 11 identified by similar numbers, having the several branches differentiated by single, double and triple primes.

The leg 8 of the bridge network 1 includes a primary pressure setting adjustable restrictor 16 shown diagrammatically as an adjustable orifice. For example, the adjustable restrictor 16 may be a pin valve having an adjustable input 17, shown diagrammatically by an arrow, for setting the pressure drop through the orifice and, thereby establishing the supply pressure applied via the leg 8 to the terminal 2. The adjustable restrictor 16 is connected in series with an ambient temperature and pressure compensation network including the necessary series-parallel combination of linear resistors and restrictors. The illustrated network includes a capillary tube resistor 18 in parallel with a fixed orifice 19. In the illustrated embodiment, the set point adjustment is made in either or both of the two legs 8 and 9 by setting of adjustable restrictors 16 and 16', either of which may be fixed, if desired. The adjustable restrictor 16, or 16', such as the pin valve, has been found to have a linear and a nonlinear function. If only one adjustable restrictor is employed, the parallel components of the compensating network in the opposite leg may be selected to compensate for the characteristic of the adjustable restrictor within the network at any given setting of the pin valve. To compensate for changes associaed with adjustment of the valve, fluidic compensation elements may be provided in the other legs 10 and 11.

In the illustrated embodiment, the two legs 10 and 11 are similarly constructed to create a balance network. Each leg 10 and 11 similarly includes the necessary series-parallel fluidic resistance elements to provide compensating networks. Legs 10 and 11 are shown connected to separate pressure sources 14, each of which may be a common reference, one of a multiplicity of references or a signal pressure. The sensing resistance elements 5 and 6 are similarly connected to individual pressure sources 14 providing the desired reference or signal pressure to the elements 5 and 6.

The sensing elements 5 and 6 may be of any desired construction which provides the desired laminar flow in accordance with the broadest concept of the present invention. For example, the elements may be linear capillary tube devices such as more fully disclosed in the article entitled "Fluidic Resistors," published in the Fluidic Quarterly, volume 1, number 3, April 1968, by Paul H. Sorenson and Norbert T. Schmitz. As disclosed therein, for any given tube diameter, there is one and only one length of tube which establishes a linear resistor for any given temperature.

The one end of the resistance element 5 is connected to the reference source 14 and the opposite end of the element 5 is connected to the common input-output junction 2 of the bridge network 1. Resistance element 6 is similarly connected to junction 3. The elements 5 and 6, shown to the opposite side of network 1, are thereby connected to the independent and dependent inputs of a summing impact modulator 15, which is connected across the junctions 2 and 3. The summing impact modulator is diagrammatically illustrated as including a pair of opposed input nozzles 20 and 21 establishing a pair of impacting streams, not shown. A collector 22 collects the fluid resulting from the impacting streams and particularly produces an output related to the position of the impacting streams with respect to the collector. The summing impact modulator 15 thus constitutes a signal comparator and produces an output related to the algebraic sum of the signals at terminals 2 and 3. The description of preferred construction and the theory of operation of the summing modulator is more fully set forth in the Bjornsen et al. patent. In the presence of flow through the bridge at the set point temperature, a predetermined output is established at line 4. If the temperature of any one or both of the resistance elements 5 and 6 changes, the pressure at the corresponding terminal 2 and 3 changes with a resulting change at line 4.

The temperature sensitive element 5 connected to the identified independent nozzle 20 provides a direct acting response wherein the fluidic output pressure increases at output line 4 when the temperature surrounding the element 5 increases. As the temperature of the respective enclosure 7 increases, the resistance value of the corresponding element 5 increases. This in essence opposes the flow from the junction 2 to the reference signal source 14, thereby increasing the input pressure signal to the independent nozzle 20 of the summing impact modulator 15. As a result, the impact position shifts toward the collector 22, and the output signal increases to produce a direct action response.

On the other hand, if the temperature adjacent a sensing element 6 should increase, a corresponding flow opposition is provided with an increased pressure at the opposite junction 3, which is applied to the dependent nozzle 21 of the modulator 15. This results in a shifting of the impact position from the collector 22 to reduce the output pressure at line 4, and thereby provides a reverse acting control or sensor.

If the temperature of the fluidic elements 5 and 6 changes, in the same or different directions, the output signal changes in accordance with the algebraic summation of the temperature changes. The present invention can thereby provide a direct acting, a reverse acting or a summated response unit in accordance with the design requirements.

The proportionate response of a sensing element 5 or 6 may be adjusted by changing of the setting of a series connected adjustable resistance element 23 to adjust the relative sensitivities between such resistance or any other sensing resistor or capillary restrictor connected in the network.

The source 14, as previously noted, may constitute a common signal source or individual fluidic signal sources for the respective branches of the fluidic network. For example, a humidity to pressure signal transducer may be connected to one or more of the branches of the network, and thereby provide an output signal proportional to the humidity condition. Obviously, any other condition which can be converted to a pressure or temperature may be sensed by the network through the use of the pressure signal connection or the temperature sensitive elements.

The illustrated bridge network of FIG. 1 with the several sensing elements connected to the opposite sides thereof can, of course, be constructed with only one or more direct acting sensing resistances, with only one or more reverse acting resistances or with any combination thereof. Further, the condition sensitive elements 5 and 6 are shown paralleled with the primary resistances of legs 8, 9, 10 and 11 and, consequently, the primary resistances may constitute the condition sensitive element. The ambient pressure and temperature sensitivity of any bridge network 1 can be readily set by changing the relative values of the compensating resistances or by changing the number and connection of series and/or parallel resistances. The sensitivity for either pressure and temperature can be further modified by employing a combination of linear or non-linear resistances. Applicant has found that by suitable adjustment of the resistances the sensitivities can be made equal to, less than or greater than zero. Furthermore, the ambient temperature sensitivity can be varied independently of the ambient pressure sensitivity over a limited range. Generally, with the paralleled sensing resistors, the output pressure change with respect to the sensed temperature change for any one resistor or capillary restrictor will be approximately in the inverse ratio of the resistance value of the respective paralleled sensing resistance.

Further, as the number of elements connected in parallel increases, the sensitivity to a change in one element is correspondingly reduced because the change is a smaller portion of the total resistance appearing at the junction.

The network can also be employed to provide a direct signal output or it can be connected in a loop control system such as shown in FIG. 2.

In FIG. 2, a bridge network 24 is shown which is similar to that shown in FIG. 1, but employs pressure regulators in place of the adjustable orifices of FIG. 1. The network 24 is shown in FIG. 2 interconnected in the amplifying loop of a control system for controlling the environment 7 adjacent a temperature sensing element 6. Corresponding elements in FIGS. 1 and 2 are, therefore, similarly numbered for purposes of simplicity of description.

Referring particularly to FIG. 2, pressure regulators 25 and 25' are connected in the respective bridge legs 8 and 9. The regulator 25 is adjustable to permit adjustment of the set point of the system. A compensating orifice 26 is shown connected in series between the regulators and the primary resistor. A compensating orifice is connected in parallel with the primary resistor as shown in FIG. 1.

In the embodiment of the invention shown in FIG. 2 a single direct acting temperature sensing element 5 is connected to the one input terminal 2 and a reverse acting temperature sensing element 6 is connected to the opposite terminal 3.

The output of the summing impact modulator 15 in turn is interconnected to a temperature controller 27 of any suitable construction and connected to a suitable conditioning means 28 which modifies the temperature of the environmental enclosure 7 for temperature sensing element 6. The output of the controller 27 is such as to return the temperature of the environment to the set point through the conditioning means 28 in response to deviations of the temperatures in the several enclosures 7 from a desired level.

Thus, the operation of the circuit basically corresponds to that previously described.

In operation, if the temperature of the controlled environment varies, the controller 27 provides an output to return the temperature to its set point. If the temperature surrounding the resistance 5 to the opposite side of the network 1 should increase, the output of the summing impact modulator 15 will correspondingly increase because of the direct acting interconnection. The increased output pressure applied to the controller 27 causes the controller output pressure to increase and thereby cause the temperature conditioner to increase the temperature surrounding element 6. The temperature is increased until the error signal across the input-output terminals of the modulator 15 is very small in accordance with known operational amplifier theory. Thus, the new temperature established surrounding resistance element 6 is increased as a function of the increase in the temperature surrounding resistance 5. This is commonly identified as a master-submaster type control.

As in the embodiment of FIG. 1, the number and location of the sensing resistors 5 and 6 can be varied to provide any desired direction action, reverse action or differential action in response to one or more temperature conditions.

In view of the essential similarity in the operations of the two networks, the particular circuit employed will generally be related to the availability and quality of the components. The use of an orifice type circuit is somewhat more subject to variation resulting from pin valve and orifice variations. On the other hand, the dual regulator is more subject to the variations normally encountered in a fluid pressure regulator device.

The present invention can be applied to sense temperature, radiated energy or other conditions which can directly establish a resistance change in a fluidic resistance element.

Applications of circuits similar to those illustrated under operating conditions have shown that they provide highly desirable environmental control systems. The structure employs a relatively direct approach without the necessity of converting the temperature characteristics to a frequency as in an oscillator type or to a fluidic pressure as in pneumatic thermostat controllers and the like. Furthermore, the interconnection in the several legs of the compensating and sensing resistance elements provides a very simple convenient and direct means for algebraic addition of two or more sets of temperature responsive fluidic signals.

As employed herein, resistance and resistance elements are general terms including linear and non-linear elements. Linear resistance elements are described and defined as resistors or linear resistors whereas non-linear resistance elements are described and defined as restrictors. Restrictors may be of capillary tubular elements, orifice and other types of construction having a non-linear characteristic.

We claim:

1. A fluidic condition sensing system, comprising a plurality of fluidic resistance elements, a fluidic supply, a fluidic pressure source, a selected balanced multiple branch network including at least two balancing branches connected to said fluid supply and said pressure source and each branch having a common input-output terminal, a fluidic summing device connected to said input-output terminals to compare the fluid signals at said input-output terminals and establish a fluid output signal proportional to the pressure at said input-output terminals, and said fluidic resistance elements including at least one condition sensitive fluidic resistance means connected in a first of said two balancing branches and a plurality of compensating resistance elements including at least one linear resistance element and one non-linear resistance element connected in the second of said two balancing branches, said plurality of compensating resistance elements in said one branch including a first resistance element in series with a pair of parallel connected resistance elements to control the signal applied through said branch to the corresponding input-output terminal.

2. The fluidic condition sensing system of claim 1, wherein said condition sensitive fluidic resistance means is a flow resistance tube establishing a laminar flow.

3. The fluidic condition sensing system of claim 1, wherein said resistance elements include a capillary tubular linear resistor as said linear resistance element in parallel with a restrictor, and said condition sensitive fluidic resistance means includes a flow resistance tubular element establishing a laminar flow.

4. The fluidic condition sensing system of claim 1, wherein said fluidic summing device includes an impacting modulating device having a pair of opposed nozzles connected to said input-output terminals to compare the fluid signals at said terminals and having an output means, and said condition sensitive fluidic resistance means being a laminar flow element.

5. The fluidic condition sensing system of claim 1, wherein said condition sensitive fluidic resistance means includes a first plurality of paralleled laminar flow resistance elements connected to a first input-output terminal and a second plurality of paralleled laminar flow resistance elements connected to the second input-output terminal.

6. The fluidic condition sensing system of claim 5, having adjustable resistance means connected in series with at least one of said paralleled laminar flow resistance elements.

7. The fluidic condition sensing system of claim 1, having a first and second branch connected in common to the fluidic supply and connected one each to said pair of input-output terminals, at least the first of said branches having a series connected adjustable non-linear resistance element for set point adjustment, the second of said branches including a restrictor in parallel with a linear resistor compensating for the linear and non-linear characteristic of the non-linear resistance element.

8. The fluidic condition sensing system of claim 7, wherein said summing device is an impacting stream comparator having a pair of opposed nozzle means connected one to each of said output terminals and having a fluidic output means.

9. The fluidic condition sensing system of claim 1, having a first and second branch connected in common to the fluidic supply and connected one each to said pair of input-output terminals, and a third and fourth branch connected one each to said pair of input-output terminals and to a corresponding fluid pressure source, a first of said branches including an adjustable restrictor in series with a paralleled capillary tube linear resistor and a restrictor, said other branches including a paralleled linear resistor and a restrictor.

10. The fluidic condition sensing system of claim 9, wherein said condition sensitive fluidic resistance means is a laminar flow element.

11. The fluidic condition sensing system of claim 9, wherein said condition sensitive fluidic resistance means includes a first plurality of laminar flow elements connected in parallel with each other to one of said input-output terminals and at least two of said branches, and a second plurality of laminar flow elements connected in parallel with each other to the second of said input-output terminals.

12. The fluidic condition sensing system of claim 9, wherein said summing device includes an impact modulator having a pair of opposed nozzle means connected one to each of said output terminals and having a fluidic output means.

13. The fluidic condition sensing system of claim 9, including a fluidic amplifying means having an input connected to the output of the summing device and having an amplified output means, means connecting the amplified output means to control the condition applied to the condition sensitive fluidic resistance means and defining an amplifying loop, said compensating resistance means connected in circuit with said condition sensitive fluidic resistance elements and being responsive to the ambient to compensate for ambient created response in the amplifying loop.

14. The fluidic condition sensing system of claim 1, wherein said balanced network defines a modified Wheatstone type bridge having four branches connected to said input-output terminals, and wherein each of said branches includes a primary fluidic capillary tube defining a linear resistor and a paralleled compensating restrictor, first and second branches being connected to a fluid supply and one of said first and second branches including an adjustable resistance means connected to provide a set point adjustment, and individual pressure sources connected to the third and fourth branch.

15. The fluidic condition sensing system of claim 14, wherein said summing device is an impacting stream comparator having a pair of opposed nozzle means connected one to each of said input-output terminals and having a fluidic output means.

16. The fluidic condition sensing system of claim 1, including a fluidic amplifying means having an input connected to the output of the summing device and having an amplified output means, means connecting the amplified output means to control the condition applied to the sensitive fluid resistance means and defining an amplifying loop, compensating resistance means connected in circuit with said primary fluidic resistance elements and responsive to the ambient to compensate for ambient created response in the amplifying loop.

References Cited

UNITED STATES PATENTS

| | | | |
|---|---|---|---|
| 3,388,713 | 6/1968 | Bjornsen | 137—81.5 |
| 3,469,592 | 9/1969 | Kuczkowski et al. | 137—81.5 |

WILLIAM R. CLINE, Primary Examiner